(12) United States Patent
Spirig

(10) Patent No.: US 8,839,637 B2
(45) Date of Patent: Sep. 23, 2014

(54) SYSTEM AND METHOD FOR COOLING BREAD AND RECOVERING THE EMITTED HEAT

(75) Inventor: Kurt Spirig, Widnau (CH)

(73) Assignee: Revent International AB, Upplands Vasby (SE)

( * ) Notice: Subject to any disclaimer, the term of this patent is extended or adjusted under 35 U.S.C. 154(b) by 92 days.

(21) Appl. No.: 13/575,113

(22) PCT Filed: Jan. 27, 2011

(86) PCT No.: PCT/EP2011/051101
§ 371 (c)(1),
(2), (4) Date: Jul. 25, 2012

(87) PCT Pub. No.: WO2011/092227
PCT Pub. Date: Aug. 4, 2011

(65) Prior Publication Data
US 2012/0301585 A1 Nov. 29, 2012

(30) Foreign Application Priority Data

Jan. 27, 2010 (EP) .................................. 10151786

(51) Int. Cl.
*F25B 27/00* (2006.01)
*A21D 15/02* (2006.01)
*F25D 31/00* (2006.01)

(52) U.S. Cl.
CPC ............... *A21D 15/02* (2013.01); *F25D 31/00* (2013.01)
USPC ............................................ 62/238.1; 62/268

(58) Field of Classification Search
CPC . F25D 31/00; F25D 17/042; F25D 2317/043; A21D 15/02; A21D 8/02
USPC ........... 62/79, 100, 238.1, 268; 426/497, 500; 165/104.21, 200; 392/308, 441
See application file for complete search history.

(56) References Cited

U.S. PATENT DOCUMENTS 3,145,562 A * 8/1964 Hamilton et al. ................. 73/76
4,308,285 A * 12/1981 Hohn et al. ..................... 426/18
(Continued)

FOREIGN PATENT DOCUMENTS

| DE | 2902270 | 7/1980 |
|----|---------|--------|
| IE | 73480 | 6/1997 |
| JP | 5236862 | 9/1993 |
| JP | 6189727 | 7/1994 |
| JP | 10028513 | 2/1998 |
| WO | 2007094141 | 8/2007 |

OTHER PUBLICATIONS

International Search Report dated Feb. 25, 2011, in corresponding PCT application.

(Continued)

*Primary Examiner* — Mohammad M Ali
(74) *Attorney, Agent, or Firm* — Young & Thompson

(57) ABSTRACT

A system (1) and a method for cooling freshly baked bread under sub-pressure, which system includes: a sub-pressure chamber (2) which is adapted for receiving freshly baked bread for the cooling thereof; a sub-pressure source (3), such as a vacuum pump, which is connected to the sub-pressure chamber (2) for exhausting fluid from the sub-pressure chamber (2) and creating a sub-pressure inside it; a condenser (4) for cooling steam exhausted from the sub-pressure chamber and separate condensed water (19) from it. The system also includes a heating tank (5) with a first heat exchanger (6) in which the heat generated by the condenser (4) is used for heating water.

7 Claims, 1 Drawing Sheet

(56) References Cited

U.S. PATENT DOCUMENTS

| | | | |
|---|---|---|---|
| 4,331,690 A * | 5/1982 | Bradshaw | 426/233 |
| 5,363,746 A * | 11/1994 | Gordon | 99/328 |
| 5,653,164 A * | 8/1997 | Vallee | 99/476 |
| 5,846,299 A * | 12/1998 | Pravda | 95/187 |
| 6,658,995 B1 * | 12/2003 | DeYoung et al. | 99/468 |
| 2003/0205222 A1 * | 11/2003 | Rabas et al. | 126/21 A |
| 2009/0260780 A1 * | 10/2009 | Katori et al. | 165/86 |
| 2010/0094454 A1 * | 4/2010 | Depot et al. | 700/230 |
| 2010/0115785 A1 * | 5/2010 | Ben-Shmuel et al. | 34/260 |
| 2012/0189743 A1 * | 7/2012 | Ajmera et al. | 426/95 |

OTHER PUBLICATIONS

Database WPI, Week 200758, Thomson Scientific, London, GB; AN 2007-612923, XP002571353, Aug. 23, 2007.

Database WPI, Week 199815, Thomson Scientific, London, GB; AN 1998-162466 XP002571354, Feb. 3, 1998.

* cited by examiner

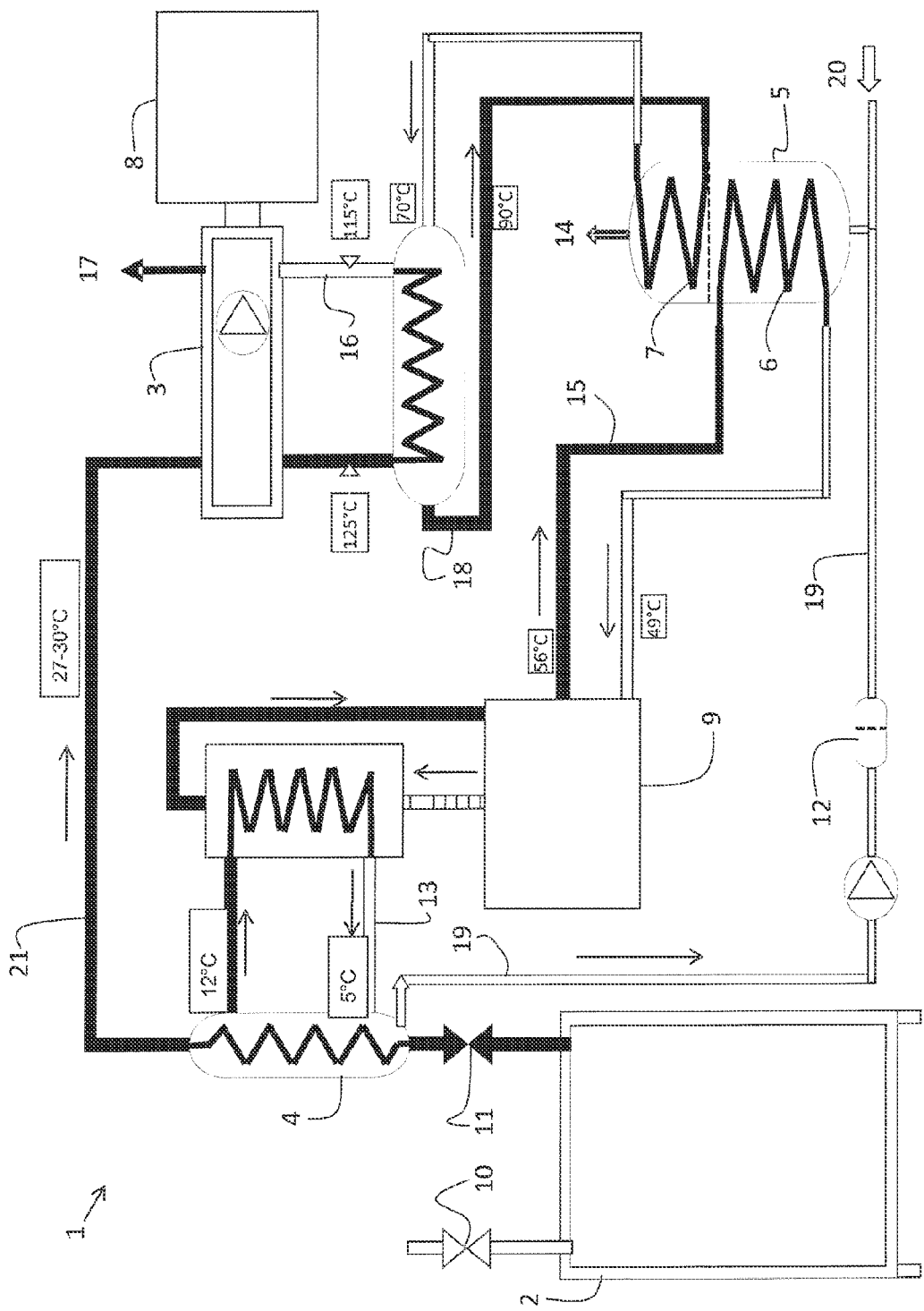

SYSTEM AND METHOD FOR COOLING BREAD AND RECOVERING THE EMITTED HEAT

TECHNICAL FIELD

The invention relates to a system and a method for cooling freshly baked bread while recovering part of their emitted heat energy. Especially, the invention relates to a system where freshly baked bread is cooled in a chamber under sub atmospheric pressure.

BACKGROUND

In the bread baking industry a lot of energy is consumed for heating bread and conventionally this heat energy is subsequently lost to the ambient environment inter alia as the breads are allowed to cool on racks somewhere close to the ovens. As the ovens also produces a lot of waste heat, the environment in an industrial bakery is very warm. Hence, there exists a desire to minimize the waste heat in order to save energy and to ameliorate the environment in industrial bakeries.

The American patent publication U.S. Pat. No. 4,331,690 discloses a method of rapidly cooling freshly baked bread in a vacuum cooling chamber. It has proven advantageous to cool bread in a vacuum chamber since it gives the bread improved properties with respect to both taste and shelf-life. However, with the method described in U.S. Pat. No. 4,331,690 it also implies yet another energy consumer and in some respect also another heat generator.

Hence, for environmental reasons, both global and specific to the baking location, it is desirable to reduce energy consumption and heat generation during cooling of freshly baked bread.

SUMMARY

An object of the invention is to provide an improved system for cooling freshly baked bread.

According to a first aspect the invention relates to a system for cooling freshly baked bread under sub-pressure, which system includes: a sub-pressure chamber which is adapted for receiving freshly baked bread for the cooling thereof; a sub-pressure source, such as a vacuum pump, which is connected to the sub-pressure chamber for exhausting fluid from the sub-pressure chamber and creating a sub-pressure inside it; a condenser for cooling steam exhausted from the sub-pressure chamber and separate condensed water from it. The system also includes a heating tank with a first heat exchanger in which the heat generated by the condenser is used for heating water.

According to a second aspect the invention relates to a method of cooling freshly baked bread under sub-pressure, which method includes the steps of: placing freshly baked bread a sub-pressure chamber for the cooling thereof; exhausting fluid from the sub-pressure chamber by means of a sub-pressure source and creating a sub-pressure inside it; condensing steam exhausted from the sub-pressure chamber and separate condensed water from it. Further the method includes a step of heating water wherein the heat generated by the condenser is used for said heating.

With the system and the method according to the invention the energy from the cooling of the bread is recycled in a fashion that allows a minimization of used energy and at the same time ameliorates the baking environment with a reduction of the ambient temperature.

Preferred embodiments of the invention and its advantages will be apparent from the detailed description and the dependent claims.

SHORT DESCRIPTION OF THE DRAWINGS

The invention, and further objects and advantages of it, is best understood from the following description with reference to the appended drawing, where:

FIG. 1 is a schematic illustration of an embodiment of the system according to the invention.

DETAILED DESCRIPTION

The invention relates to a system for cooling freshly baked bread under sub-pressure and below the system will be described with reference to FIG. 1.

The system 1 involves a sub-pressure chamber 2, e.g. a vacuum chamber, which is adapted for receiving freshly baked bread for the cooling thereof. Preferably, the sub-pressure chamber 2 has the size and form of a rack oven, such that a rack of freshly baked bread can be directly inserted from the rack oven and into the sub-pressure chamber 2 without specific handling of the rack. The sub-pressure chamber 2 involves two air valves 10 and 11. The first air valve 10 is arranged for ventilation to let in ambient air into the chamber when the sub-pressure cooling of the bread is completed and other valve 11 is connected to a sub-pressure source 3 for creating a sub-pressure inside the chamber.

The sub-pressure source 3, e.g. a vacuum pump that is driven by an electric motor 8, is connected to the sub-pressure chamber 2 for exhausting fluid from the chamber 2 and creating a sub-pressure inside it. The air that is thus exhausted from the sub-pressure chamber 2 is relatively warm and contains a lot of steam coming from the bread that is being cooled inside the chamber.

In the shown embodiment the heat system involves a number of mini systems with relatively warm and connection cold lines in which the relatively warm and energy containing connection lines of each mini system are represented in FIG. 1 as black, and the relatively cooler connection lines of the same mini system are white.

A condenser 4, for cooling the air that is exhausted from the sub-pressure chamber 2, is arranged between the outlet of the sub-pressure chamber 2 and the sub-pressure source 3 such that the steam comprised in the exhaust air is condensed to (liquid) water. The condensed water 19 is thus separated from the air and the air 21 that reaches the sub-pressure source 3 is therefore relatively dry and free from steam. The separated exhausted air 21 has a temperature of about 27-30° C.

The cooling of the exhaust air and especially the transformation of the water from a gaseous medium (steam) to a liquid medium produces a lot of heat energy. By means of the condenser 4 this heat energy is released to a cooling liquid 13 of the condenser 4.

A main concept of the invention is to utilise the heat energy that is transferred to the cooling liquid 13 for energy saving purposes. As the environment within a bakery, where the system is to be implemented, is already warm there is certainly no need for an additional heat source that a conventional air cooling of the cooling liquid would imply. Therefore, in accordance with the invention, the system includes a heating tank 5 with a first heat exchanger 6 in a first heating zone of the heating tank in which the heat generated by the condenser is used for heating water. The thus heated water may be used in any way desired and it may for instance be connected to a tap water system for supply of warm water 14.

A heat pump 9 is arranged to in a conventional manner where the cooling liquid 13 is the source of the heat pump 9 and the first heat exchanger 6 of the heating tank 5 is the heat sink of the heat pump 9. In the heat sink a heating liquid 15 heats water inside the heating tank 5.

In the shown embodiment of the invention the water inside the heating tank to be heated is indeed the condensed water 19 that is obtained from the exhaust air from the sub-pressure chamber 2. If the condensed water 19 is to be recycled additives should preferably be added to it in order to make up for essential minerals that have been lost from the water in the steam process of the baking oven and sub-pressure chamber. A water treatment station 12 is therefore arranged between the condenser and the heat tank 5. The water treatment station 12 may also be located at the outlet of the heat tank 5. Additives of this kind as well as the addition of them are well known in the art, and are therefore not described more closely herein.

The system may very well be a closed system for producing hot water, in the respect that the condensed water 19 obtained in the system is heated to a desired temperature inside the system and delivered as a final product from the system to be used outside the system. However, fresh water 20 may be added to the heating tank in addition to the condensed water if the heating capacity of the heat exchanger 6 exceeds the amount of condensed water.

In order to improve the efficiency of the system the heat generated by the sub-pressure source 3 may be utilised. Preferably, the sub-pressure source 3 is a vacuum pump that in operation generates heat which is cooled off by a cooling liquid 16. The cooling liquid 16 may be used directly or indirectly in a second heat exchanger 7 arranged at the heating tank 5 to heat the water that has been heated by the first exchanger 6 additionally. This allows the water be heated to about 70° C., or more.

In the shown embodiment of the invention, the heat generated by the cooling liquid 16 is transferred to a heating liquid 18, which in turn heats the water in the heating tank 5 via a second heat exchanger 7, defining a second heating zone.

In the bakery industry a lot of water is consumed, for instance in the rack ovens where steam is added to give the bread an attractive surface and savoury consistence. Hence, an advantageous use of the heated water is to feed it back to the rack ovens in order to reduce the amount of heat energy necessary to produce steam inside them. The outlet of the heating tank may therefore be connected to an oven for baking bread, such that the heated water may be directly conducted to the oven for producing steam to be used in the baking of new bread.

It is of course also possible to collect all the heated water into a heat insulated reservoir from which water is tapped when needed, in any desired use. Further the heating tank 5 may be furnished with an electrical heater which is arranged to be used if the amount of heated water is not sufficient. With such an arrangement the system could replace, and not only complement, any existing heating system since no other heating system for hot water will be needed.

As a contrast to the system that is schematically shown on FIG. 1, the sub-pressure chamber may very well be a part of an automatic or semiautomatic baking system, where a number of different stations or chambers are located side by side. For instance, the bread may be allowed to rise in a first chamber, whereupon it is conveyed on belts or on baking plates into a second chamber, which may be an oven for baking. After the baking, the bread is once again conveyed on belts or baking plates to a third chamber, which in this case is the sub-pressure cooling chamber. For best output of such an automatic system all chambers should be at use as much as possible with as few interruptions as possible, such that when a load of bread is moved out from one chamber another load is inserted. The logistic of achieving an optimal use is common general knowledge for a person skilled in the area and is therefore not treated in detail in this application.

The invention also relates to a method of cooling freshly baked bread under sub-pressure. The steps of the method correspond to the system. A first step involves placing freshly baked bread the sub-pressure chamber 2 for the cooling thereof. Once the door of the sub-pressure chamber 2 is closed the cooling of the bread may start by exhausting fluid from the sub-pressure chamber 2 by means of the sub-pressure source 3, such that a sub-pressure is created inside the chamber.

The steam comprised in the fluid that is exhausted from the sub-pressure chamber is condensed by means of a condenser 4 and condensed water 19 is separated from the exhausted fluid, whereas dry air 21 is conveyed to the sub-pressure source 3. The heat generated in the condenser 4 is used for heating water in a heating tank 5.

In one embodiment the method further involves the step of heating the condensed water 19 that has been separated from the air 21 exhausted from the sub-pressure chamber 2. Also, the heat generated by the operation of the sub-pressure source 3 may be used for heating the heated water additionally.

As a final step, to close the circle, the heated water 14 may be used for producing steam in an oven during the baking of new bread. However, as indicated above, the produced hot water can be used for washing, for cooking, for steaming or anything else where hot water is needed.

Above, the invention has been described with reference to specific embodiments. It is, however, obvious to a person skilled in the art that other embodiments may be used to achieve the same result within the scope of the invention. Hence, the invention is not limited by these embodiments; instead it is only limited by the appended claims.

The invention claimed is:

1. System (1) for cooling freshly baked bread under sub-pressure, which system includes: a sub-pressure chamber (2) which is adapted for receiving freshly baked bread for the cooling thereof; a sub-pressure source (3), such as a vacuum pump, which is connected to the sub-pressure chamber (2) for exhausting fluid from the sub-pressure chamber (2) and creating a sub-pressure inside it; a condenser (4) for condensing steam exhausted from the sub-pressure chamber and separate condensed water (19) from it, wherein in that the system also includes a heating tank (5) with a first heat exchanger (6) in which the heat generated by the condenser (4) is used for heating water.

2. System (1) according to claim 1, wherein the condensed water (19) is conducted to the heating tank (5) to be heated by the first heat exchanger (6).

3. System (1) according to claim 2, which system is a closed system for producing hot water from the condensed water wherein the condensed water (19) is heated to a desired temperature and wherein fresh water (20) may be added to the heating tank (5) if the heating capacity of the first heat exchanger (6) exceeds the amount of condensed water (19) to heat.

4. System (1) according to claim 1, wherein the sub-pressure source (3) is a vacuum pump that in operation generates heat which is cooled off by a cooling liquid, wherein the cooling liquid is used in a second heat exchanger (7) arranged at the heating tank (5) to heat the heated water additionally.

5. System (1) according to claim 1, wherein the heating tank (5) is connected to a steam oven for baking bread, such that the heated water may be conducted to said oven for producing steam therein to be used in the baking of new bread.

6. System according to claim 1, wherein the heating tank (5) involves an electrical heater which is arranged to be used if the amount of heated water is not sufficient.

7. System according to claim 1, wherein it comprises a heat pump (9) and the condenser (4) has cooling liquid (13) which contains heat generated by the condenser (4) and said cooling liquid (13) is used as a heat source by the heat pump (9) and the first heat exchanger of the heating tank (5) is the heat sink of the heat pump (9).

* * * * *